US012568073B2

(12) United States Patent
Lewis et al.

(10) Patent No.: US 12,568,073 B2
(45) Date of Patent: *Mar. 3, 2026

(54) SECURE EXCHANGE OF CERTIFICATE AUTHORITY CERTIFICATE INLINE AS PART OF FILE TRANSFER PROTOCOL

(71) Applicant: Dell Products L.P., Round Rock, TX (US)

(72) Inventors: Donna Barry Lewis, Holly Springs, NC (US); Senthil Ponnuswamy, San Jose, CA (US); Mahadev Karadigudda, San Jose, CA (US); Abhidnya Joshi, Pune (IN)

(73) Assignee: Dell Products L.P., Round Rock, TX (US)

( * ) Notice: Subject to any disclaimer, the term of this patent is extended or adjusted under 35 U.S.C. 154(b) by 377 days.

This patent is subject to a terminal disclaimer.

(21) Appl. No.: 17/862,547

(22) Filed: Jul. 12, 2022

(65) Prior Publication Data

US 2024/0022554 A1      Jan. 18, 2024

(51) Int. Cl.
*H04L 29/06* (2006.01)
*H04L 9/40* (2022.01)
*H04L 67/06* (2022.01)

(52) U.S. Cl.
CPC ...... *H04L 63/0823* (2013.01); *H04L 63/0442* (2013.01); *H04L 67/06* (2013.01)

(58) Field of Classification Search
CPC .. H04L 63/0823; H04L 63/0442; H04L 67/06
See application file for complete search history.

(56) References Cited

U.S. PATENT DOCUMENTS 6,931,528 B1 * 8/2005 Immonen .............. H04L 9/3263
726/19
8,819,244 B2 * 8/2014 Tung ................... H04L 41/0654
709/227

(Continued)

OTHER PUBLICATIONS

Suparna Bhattacharya et al., Coordinating Backup/Recovery and Data Consistency Between Database and File Systems, Jun. 3, 2002, ACM, pp. 500-511. (Year: 2002).*

(Continued)

*Primary Examiner* — Kari L Schmidt
*Assistant Examiner* — Fahimeh Mohammadi
(74) *Attorney, Agent, or Firm* — Dergosits & Noah LLP; Todd A. Noah

(57) ABSTRACT

Systems and methods for using certificate authority certificates inline as part of a file transfer protocol are described. A backup system may receive a request from a client system for a first secure communications channel secured with a previously-shared encryption key. The backup system may transmit a message via the first secure communications channel that indicates that the backup system is one-way CA certificate encryption capable. In response to the message, the client system may transmit a query to create a second secure communications channel. The backup system may then transmit, via the first secure communications channel, the one-way CA certificate to the client system. Once the client system has been configured for CA certificate-based communication, the second secure communications channel may be established. The client system may then transmit, via the second secure communications channel, encrypted client data for storage on the backup server.

17 Claims, 5 Drawing Sheets

(56)  References Cited

U.S. PATENT DOCUMENTS

| | | | | |
|---|---|---|---|---|
| 9,424,400 | B1 * | 8/2016 | Blankenbeckler | H04L 9/321 |
| 9,787,668 | B1 * | 10/2017 | Marathe | H04L 63/0435 |
| 2011/0252144 | A1 * | 10/2011 | Tung | H04L 41/0654 |
| | | | | 709/227 |
| 2011/0296520 | A1 * | 12/2011 | Erofeev | H04L 63/0209 |
| | | | | 726/14 |
| 2015/0301821 | A1 * | 10/2015 | Danne | H04L 67/06 |
| | | | | 717/169 |
| 2016/0219043 | A1 * | 7/2016 | Blanke | H04L 9/3263 |
| 2016/0294794 | A1 * | 10/2016 | Mancic | H04L 63/0421 |
| 2017/0230355 | A1 * | 8/2017 | Su | H04L 63/0435 |
| 2019/0250937 | A1 * | 8/2019 | Thomas | G06F 9/5077 |
| 2021/0014048 | A1 * | 1/2021 | Lee | H04L 9/0825 |
| 2021/0176283 | A1 * | 6/2021 | Ippatapu | H04L 67/1095 |
| 2022/0029974 | A1 * | 1/2022 | Manser | H04L 9/0819 |
| 2022/0330352 | A1 * | 10/2022 | Horn | H04L 63/0281 |
| 2023/0164655 | A1 * | 5/2023 | Zhang | H04L 47/193 |
| | | | | 370/331 |
| 2023/0308433 | A1 * | 9/2023 | Katyal | H04L 63/166 |

OTHER PUBLICATIONS

Lipika Deka et al., Consistent Online Backup in Transactional File Systems, Nov. 2014, IEEE, vol. 26, Issue: 11, pp. 2676-2688. (Year: 2014).*

Arthur Rahumed, et al., A Secure Cloud Backup System with Assured Deletion and Version Control, Oct. 17, 2011, IEEE, pp. 160-167. (Year: 2011).*

Osama Ahmed Khashan, Secure Outsourcing and Sharing of Cloud Data Using a User-Side Encrypted File System, Nov. 18, 2020, IEEE, vol. 8, pp. 1-13. (Year: 2020).*

Bhattacharya et al., Coordinating Backup/Recovery and Data Consistency Between Database and File Systems, Jun. 3, 2002, ACM, pp. 500-511.

Deka et al., Consistent Online Backup in Transactional File Systems, Nov. 2014, IEEE, vol. 26, Issue: 11, pp. 2676-2688.

Rahumed et al., A Secure Cloud Backup System with Assured Deletion and Version Control, Oct. 17, 2011, IEEE, pp. 160-167.

Khashan, Osama Ahmed, Secure Outsourcing and Sharing of Cloud Data Using a User-Side Encrypted File System, Nov. 18, 2020, IEEE, vol. 8, pp. 1-13.

* cited by examiner

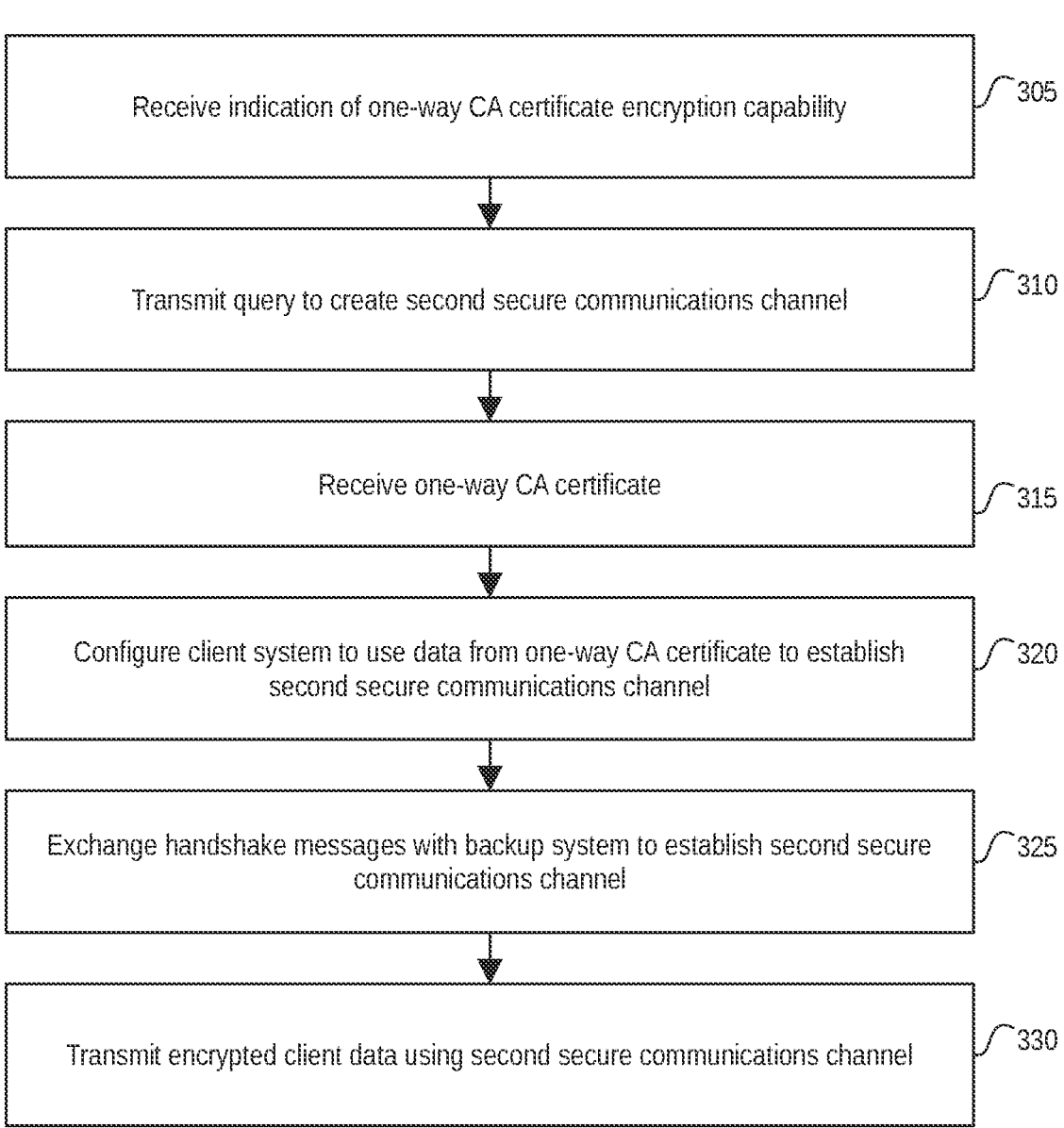

300

Receive indication of one-way CA certificate encryption capability ⟋ 305

Transmit query to create second secure communications channel ⟋ 310

Receive one-way CA certificate ⟋ 315

Configure client system to use data from one-way CA certificate to establish second secure communications channel ⟋ 320

Exchange handshake messages with backup system to establish second secure communications channel ⟋ 325

Transmit encrypted client data using second secure communications channel ⟋ 330

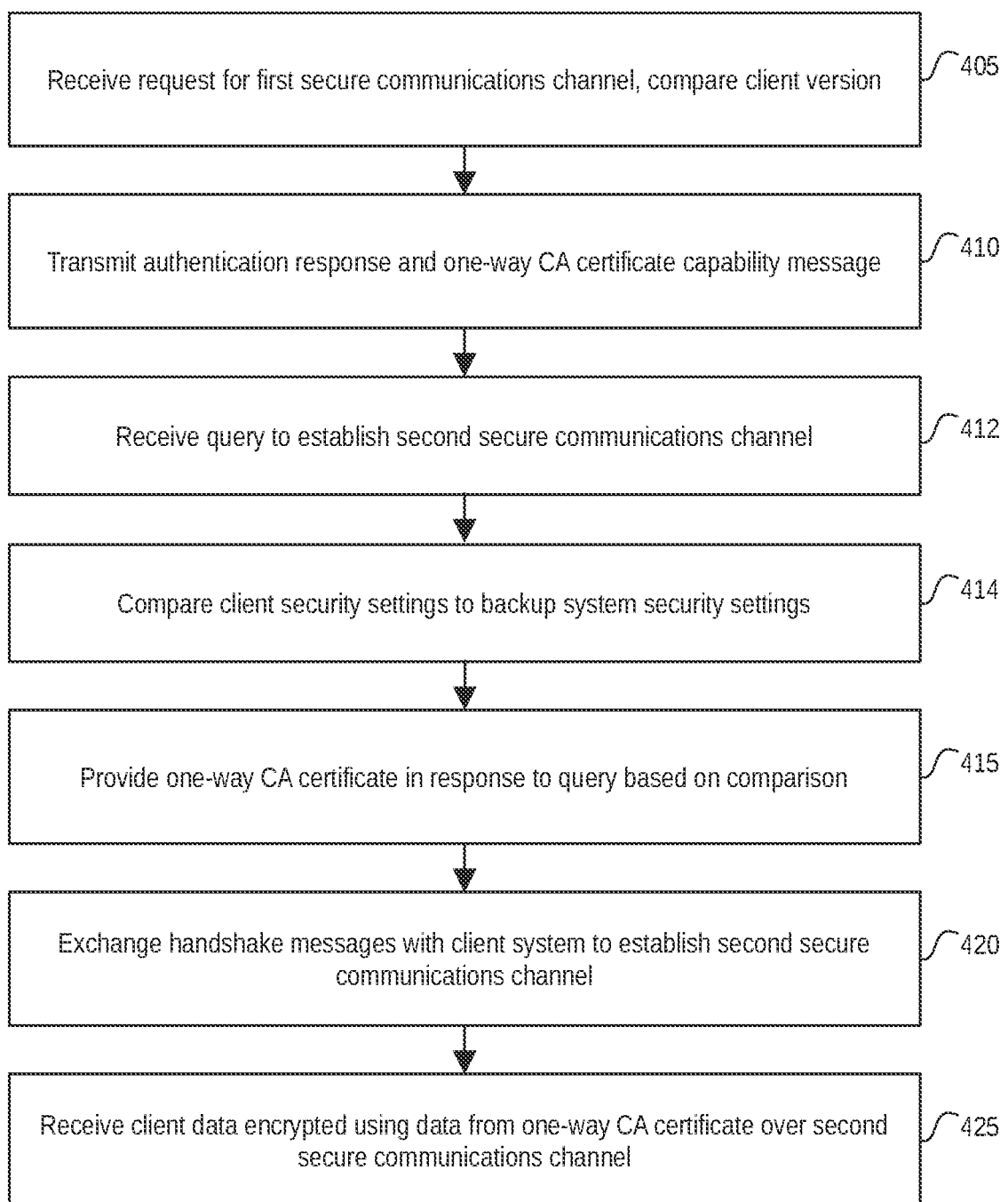

Receive request for first secure communications channel, compare client version　　405

Transmit authentication response and one-way CA certificate capability message　　410

Receive query to establish second secure communications channel　　412

Compare client security settings to backup system security settings　　414

Provide one-way CA certificate in response to query based on comparison　　415

Exchange handshake messages with client system to establish second secure communications channel　　420

Receive client data encrypted using data from one-way CA certificate over second secure communications channel　　425

SECURE EXCHANGE OF CERTIFICATE AUTHORITY CERTIFICATE INLINE AS PART OF FILE TRANSFER PROTOCOL

TECHNICAL FIELD

This disclosure relates to secure communications channels between devices over a network connection, and more particularly, use of certificate authority certificates more efficiently to secure such communications channels.

BACKGROUND

Since security is a significant concern for file transfer protocols over a network, almost every existing protocol implements a secure way of authentication. Even though many custom ways of authentication and encryption exist, the secure sockets layer-transport layer security (SSL-TLS) protocol is generally the most recommended and commonly used. The SSL-TLS protocol can be used within other protocols as well. For example, the DDBoost protocol may be used by the Data Domain™ data protection platform provided by Dell EMC Corporation (Dell EMC) to provide inline deduplication by using the SSL-TLS protocol via remote procedure call (RPC) protocol. Using certificate-based authentication is often recommended and a prime requirement for various certifications and compliance. With this requirement, managing, deploying, and updating the certificates in a large-scale environment with thousands of clients and few servers can be cumbersome. In particular, maintaining up-to-date certificates for the clients can require significant overhead, in terms of additional processing or an entirely separate application being needed separately to update and verify certificates used for secure communications.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

FIG. 3 is a flow diagram illustrating an example method of using certificate authority certificates inline as part of a file transfer protocol according to one or more embodiments of the disclosure.

FIG. 4 is a flow diagram illustrating an example method of using certificate authority certificates inline as part of a file transfer protocol according to one or more embodiments of the disclosure.

DETAILED DESCRIPTION

Figure 1:
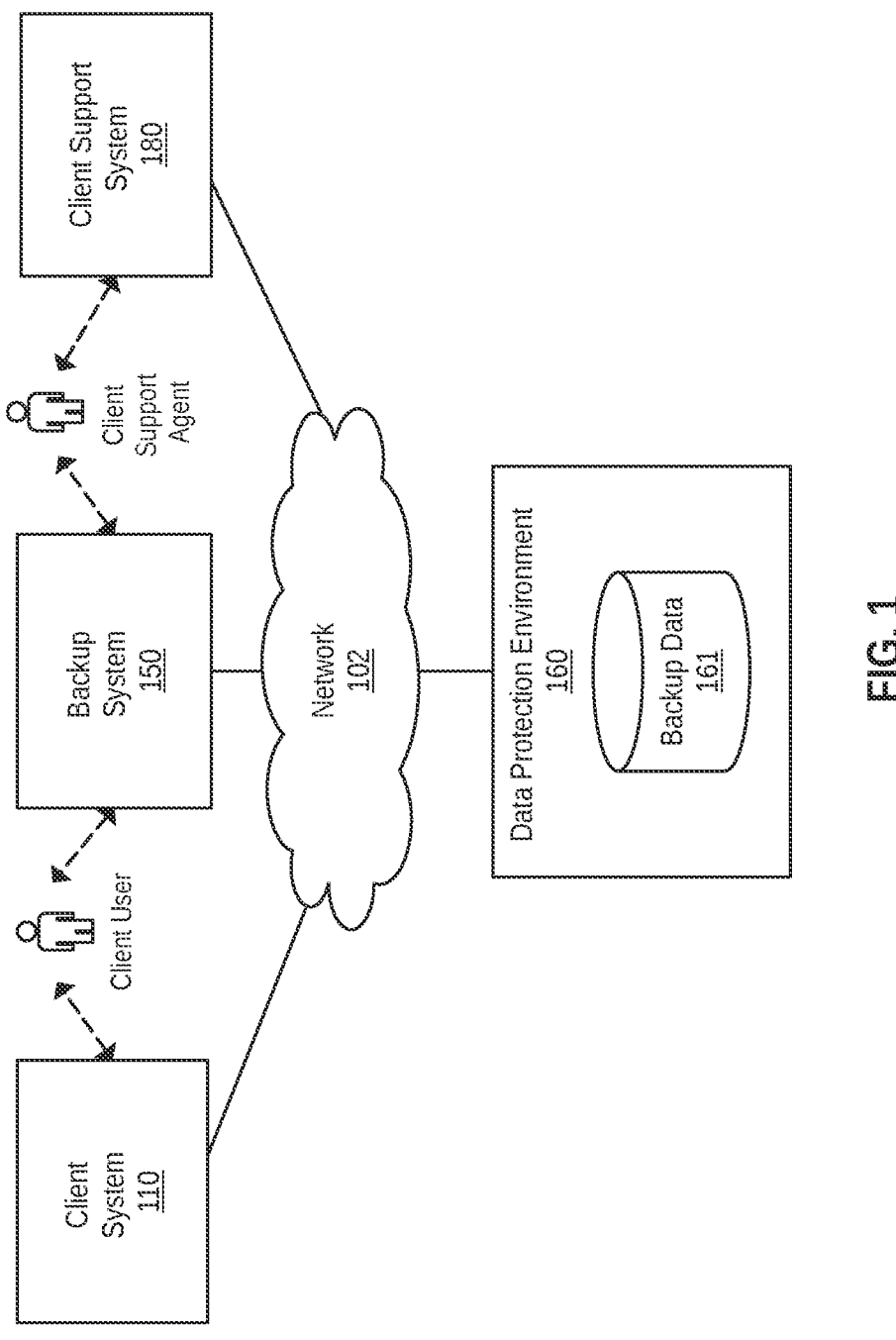
FIG. 1 is a block diagram illustrating an example operating environment for using certificate authority certificates inline as part of a file transfer protocol, according to one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) for using certificate authority certificates inline as part of a file transfer protocol. In particular, a backup server (that is part of a larger backup system) can securely send a certificate authority (CA) certificate to the client "inline" as part of the authentication sequence in an encrypted way, which in turn can be used to verify server identity by the client. For example, a backup system in communication with a client system may receive, via a network connection, a request for a first secure communications channel secured with a previously-shared encryption key accessible by both the client system and the backup system. After the first secure communications channel has been established, the backup system may transmit a message via the first secure communications channel that includes an indication that the backup system is one-way CA certificate encryption capable.

In response to the message, the client system may transmit, via the first secure communications channel, a query to create a second secure communications channel between the client system and the backup system. The query to create the second secure communications channel may include a message indicating that the client system has security requirement settings that do not require CA encryption, in some embodiments. The backup system may compare the received client security requirement settings to backup security requirement settings, where the backup security requirement settings may indicate that no CA encryption is required, that one-way CA encryption is required, or that two-way CA encryption is required. When the backup security requirement settings indicate that one-way CA encryption is required, the backup system may prepare for setting up the second secure communications channel, regardless of the client security requirement settings. In some embodiments, the backup system may create a context associated with the second secure communications channel, which includes creating a pointer to a one-way CA certificate.

The backup system may then transmit, via the first secure communications channel, the one-way CA certificate to the client system. After receiving and decrypting the received one-way CA certificate, the client system may in some embodiments then authenticate the one-way CA certificate with a server associated with the CA, thereby verifying the identity of the backup system to establish a higher-security second secure communications channel. After authenticity of the one-way CA certificate has been verified, the client system may then be configured to use data from the one-way CA certificate to establish the second secure communications channel. This configuration may include, for example, creating a context on the client system, indicating within the context an encryption cypher obtained from the one-way CA certificate, and providing a pointer to a location in memory of the one-way CA certificate received from the backup system for use by the context.

Once both contexts have been established, handshake messages that are encrypted using the data from the one-way CA certificate may be sent over the first secured connection between the backup system and the client system. After the second secure communications channel, which is secured with the data from the one-way CA certificate, has been established in response to the exchange of handshake messages, the client system may transmit, via the second secure communications channel, encrypted client data for storage on the backup system.

In some embodiments, such systems may be provided within an operating environment. An example of such an operating environment is further described herein with reference to FIG. 1. However, in general, embodiments of the disclosure may include and/or be implemented in an operating environment including a cloud-based services environment that may be, or include, a data protection operating environment that includes data protection and backup services. For example, at least some functionality may be provided by, or implemented in connection with, various platforms such as the Data Domain™ data protection platform provided by Dell EMC Corporation (Dell EMC), and associated systems, methods, and components, although use of this particular platform is provided only by way of illustration and is not required.

In some embodiments, the operating environment may take the form of a cloud-based environment. However, embodiments of the disclosure may also be implemented for an on-premises environment, and hybrid environments that include public and private elements, as well as any other type of environment. In addition, any of these cloud environments, or other operating environments, may take the form of an operating environment that is partly, or completely, virtualized. The environment may include one or more host devices that each host one or more applications used by a client of the environment. As such, a particular client may employ, or otherwise be associated with, one or more instances of each of one or more applications. In general, the applications employed by the clients are not limited to any particular functionality or type of functionality.

Any of the devices, including the clients, servers, and hosts, in the operating environment can take the form of software, physical machines, or virtual machines (VM), or any combination thereof, though no particular device implementation or configuration is required for any embodiment. Similarly, storage components (or devices) such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the storage of data can employ any suitable storage technique, infrastructure, or hardware (e.g. Solid State Drive (SSD), Hard Disk Drive (HDD)), which may include virtual storage systems provided by a cloud service provider.

More specifically, and with reference to FIG. 1, shown is a block diagram illustrating an example of an operating environment 100 for securely authorizing service level access to a system according to one or more embodiments of the disclosure.

As shown, the operating environment 100 may include a client system 110, a backup system 150, a data protection environment 160, and a client support system 180. It should be noted that the components of operating environment 100 may interact via a network 102, which may be any type of wired or wireless network including a local area network (LAN), a wide area network (WAN), or a direct communication link, or other suitable connection.

The client system 110 may be associated with a client (or customer) of a data protection platform and act as a client from which data to be protected (e.g. backed-up) originates. The client system 110 may host one or more client applications and may be associated with data that is stored and/or backup up to the data protection environment 160. The client system 110 may also be associated with a client user such as a backup administrator that interacts with the backup system 150.

In some embodiments, the backup system 150 may include one or more components that are associated with providing data protection and recovery services. For example, the backup system 150 may include a backup server or appliance. The backup system 150 may be an on-premises (e.g. maintained by a customer or client of the data protection and recovery services), or part of a cloud-based system provided as part of an on-demand service. The backup system 150 may direct (or control, initiate, etc.), or work in conjunction with, other components of the operating environment 100 to perform various operations as further described herein. In addition, the backup system 150 may provide an interface (e.g. application programming interface (API), graphical user interface (GUI), command line interface (CLI), etc.) that allows a user to interact with the backup system 150, or particular components thereof. In addition, the backup system 150 may manage one or more user accounts (or access levels) that have differing privileges as further described herein.

In some embodiments, the backup system 150 may include, or work in conjunction with one or more backup components including a backup application that performs (or manages, coordinates, etc.) the creation and restoration of data that may be backed-up. The backup components may include a backup appliance such as a Dell EMC CloudBoost appliance, although any suitable appliance is contemplated. In addition, the backup components may include a backup server that may be implemented in conjunction with a Data Domain deduplication storage server provided by Dell EMC for use with Data Domain™ Restorer (DDR) storage devices. In some embodiments, the backup server may be a Dell EMC Avamar server or a Dell EMC Networker server, although no particular server is required, and other backup and storage system configurations are contemplated. It should be noted that components of the backup system 150 (e.g. backup application, backup appliance, or backup server) can be implemented in various forms, such as a virtual, physical, or native public cloud appliance to fit the requirements of a particular configuration.

The data protection (or backup storage) environment (or system) 160 may store backup data (or data) 161. The data protection environment 160 may also store metadata for the backup data 161 and include one or more instances of a filesystem that catalogs files and other data residing in the data protection environment 160. In general, the storage of backup data 161 may be configured to store client system 110 data backups that can be restored in the event of a loss of data.

The client support system 180 may be associated with a provider of a data protection and recovery service associate with a customer (or client system 110). Accordingly, a user such as a client support agent associated with the client support system 180 may provide various support services for the backup system 150. For example, a client support agent (or client support system 180) may provide a specialized access key (or access code, password, etc.) authorizing a client user associated with the client system 110 to access the backup system 150 with a service account (e.g., service level access).

As noted above, a file transfer protocol (e.g., DDBoost provided by Dell EMC) for the backup system 150 may use an RPC protocol to support certificate-based authentication using the SSL-TLS protocol. The SSL-TLS protocol conventionally expects respective CA certificates provided by the client system as well as from the backup server side. The various authentication modes supported by an embodiment of the file transfer protocol may include one-way and two-way authentication modes based on CA certificates. While two-way authentication mode is generally most secure, as it involves both the client system and the backup server both verifying the CA certificates of each other with a CA server, it also requires certificate management to be done, generally using a separate application or module running on each of the client system and the backup server. It is expected that the CA cert application would orchestrate the certificate generation for client, server, obtain certificates that are signed by the CA, and make these respective certificates available to the client and backup server. This makes it mandatory to have this certificate orchestration application or module as a prerequisite for the use of the CA certificate secured authentication method.

Embodiments disclosed below describe setting up a first secure connection using a pre-shared key. Once this is successful, the first secure connection may be used to encrypt and return the backup server's CA certificate (which includes a public key associated with the backup system). Using the backup server's CA certificate, the TLS handshake can be repeated, this time using one-way authentication, as the backup server's CA certificate is now available to the client. This solution allows a client system previously only able to use a pre-shared key-based cipher-suite (e.g., TLS_PSK_WITH_AES256_CBC_SHA) to secure their connection to use a more secure cipher-suite (e.g., DHE-RSA-AES256-GCM-SHA384), without the overhead of certificate management applications or modules. This is particularly an improvement in security software libraries, such as OpenSSL, which do not support any PSK based ciphers recognized as having a strong security rating. The below-discussed exemplary embodiments allow a customer to setup a connection using a cipher-suite recognized as strong without the need to deploy certificate management.

Figure 2:
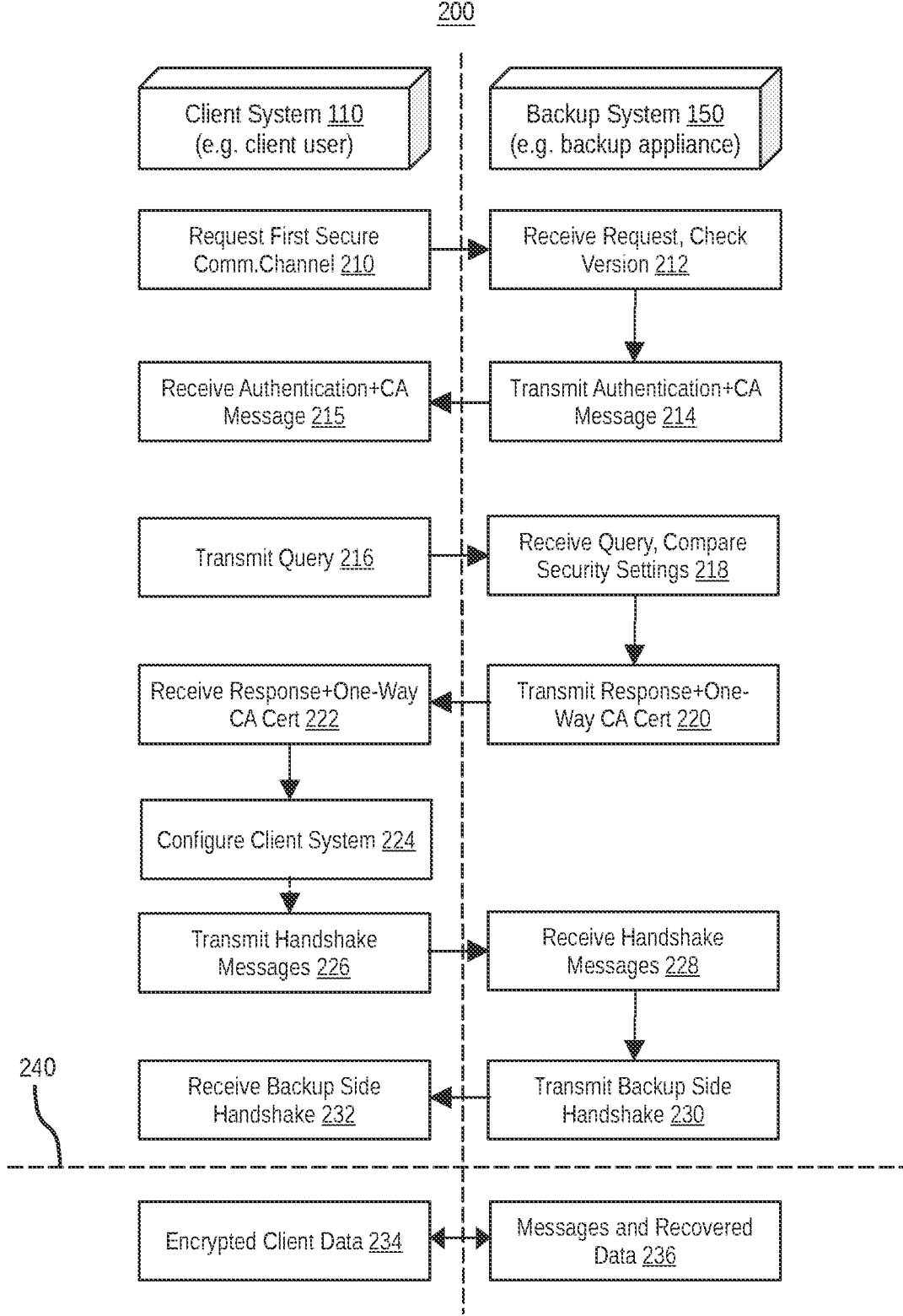
FIG. 2 is a block diagram illustrating an example interaction between components when using certificate authority certificates inline as part of a file transfer protocol according to one or more embodiments of the disclosure.

FIG. 2 is a block diagram 200 illustrating an example interaction between components when using certificate authority certificates inline as part of a file transfer protocol according to one or more embodiments of the disclosure. As shown, in some embodiments, securely authorizing the service level access may include an interaction between a client system (or client) 110 and a backup system 150. As shown, in block 210, the client 110, or a client user associated with the client 110, may request a first secure communications channel with the backup system 150. The first secure communications channel may be secured with a previously-shared encryption key (PSK) accessible by both the client system 110 and the backup system 150. For example, the PSK may have been generated upon the client system 110 registering with the backup system 150 for backup services.

Continuing with the example in diagram 200, in block 212, the backup system 150 may receive the request for the first secure communications channel. In some embodiments, the request for the first secure communications channel may include a message that describes the client version of the file transfer protocol used to transmit backup files to the backup system 150. In response to the request, in block 214, the backup system 150 may respond by authenticating the request and transmitting an authentication message to the client system 110 to complete the handshake and thereby establish the first secure communications channel. The authentication message may take the form of, for example, of a PSK authentication handshake procedure, whereby the response may be used by the client system 110 to confirm that the previously-shared encryption key is in the possession of the backup system 150. The response by the backup system at block 214 may also include a message that includes an indication that the backup system 150 is one-way CA certificate encryption capable. The message may be transmitted any time after the first secure communications channel is established, including immediately after the authentication message is transmitted, or after a predetermined period of time has passed. In some embodiments, this message may be transmitted based on the backup system 150 identifying that the received client version of the file transfer protocol supports receiving a CA certificate. The backup system 150 may identify that the client version of the file transfer protocol based on receiving, from the client system 110, the file transfer protocol version, either as part of the handshake establishing the first secured communications channel, or at a later time. When the received client version indicates that the file transfer protocol supports CA certificates (e.g., based on the backup system 150 comparing the received client version to a list of client versions that support CA certificates, and identifying a match), the backup system 150 may transmit the indication that the backup system 150 is one-way CA certificate encryption capable. In other embodiments, the backup system 150 may transmit the indication message that it is one-way CA certificate encryption capable regardless of the client version, which may be received by the client system 110 at block 215.

At block 216, the client system 110 may transmit, via the first secure communications channel, a query to create a second secure communications channel between the client system 110 and the backup system 150. The query, which may be a SSL query to establish a CA certificate-secured communications channel, may be transmitted at block 216, and at block 218 the query for the second secure communications channel is received, triggering a comparison of security settings of the client and backup systems. Conventionally, the SSL querying process includes a comparison of the client and server TLS settings by the backup system 150, and uses the most the most secure setting required, or fails if most secure setting isn't possible based on the client configuration. The query to create the second secure communications channel may include a message indicating that the client system has security requirement settings that do not require CA encryption, in some embodiments. The backup system may compare the received client security requirement settings to backup security requirement settings, where the backup system security requirement settings may indicate that no CA encryption is required, that one-way CA encryption is required, or that two-way CA encryption is required. That means that when the client system 110 specifies no security requirements, and the backup system 150 has anon or two-way-password with encryption, the SSL connection will be established using the corresponding encryption setting. Similarly, if the client system 110 specified one-way or two-way authentication, then the SSL connection will be established using one-way or two-way authentication respectively, assuming the CA certificates are configured properly on the backup server 150. However, if the client system 110 specifies no security settings, and the backup system indicates that one-way or two-way auth with encryption are required, conventional systems will fail the connection, and no CA certificate-secured channel will be established.

By contrast, the exemplary solution displayed in system 200 results in a different outcome. When the backup security requirement settings indicate that one-way CA encryption is required, the backup system may prepare for setting up the second secure communications channel, regardless of the client security requirement settings. If client system 110 specifies no security settings and backup server 150 indicates one-way authentication is supported, the backup server 150 will send its CA certificate to client system 110 to use for a one-way TLS exchange. Only if the client system 110 specifies no required security settings and the backup server 150 indicates that it requires two-way authentication will the SSL connection fail in the system 200. At block 220, backup system 150 may then transmit, via the first secure communications channel, the one-way CA certificate to the client system 110, based on the comparison of security settings resulting in one-way CA encryption being selected, either by both client and backup system requiring one-way, or when the backup system requires one-way CA certificate authentication and the client security settings indicating no requirement. Since it is transmitted via the first secure communications channel, the one-way CA certificate is encrypted using the previously-shared encryption key. In some embodiments, the response transmitted at block 220 includes a message indicating that the CA certificate is included. After receiving, at block 222, the one-way CA certificate, the client system 110 is able to establish the second secure communications channel.

However, before executing the TLS handshake procedure with the backup system 150, in block 224, the client system 110 may need to perform several configuration steps. For example, the client system 110 may decrypt the one-way CA certificate using the previously-shared encryption key and copy the decrypted one-way CA certificate to a memory buffer on the client system 110. The client system then may authenticate the one-way CA certificate with a server associated with the CA, thereby verifying the identity of the backup system to establish the second secure communications channel. This configuration at block 224 may further include, for example, creating an SSL context on the client system and indicating within the context that the TLS exchange will be one-way. The configuring at block 224 may further include indicating which encryption cypher will be used. Obtained from the one-way CA certificate, in an embodiment a X509 certificated-based encryption cipher may be indicated in the SSL context (e.g., DHE-RSA-AES256-GCM-SHA384). The configuring at block 224 may also include providing a pointer to the location in memory (e.g., the previously-mentioned buffer) of the one-way CA certificate for use by the client-side context.

After configuration is complete, the backup system 150 and the client system 110 may exchange, via the first secure communications channel, handshake messages (e.g., standard TLS handshake process messages) that are encrypted using the data from the one-way CA certificate. At block 226 the client system 110 transmits the handshake messages generated using the one-way CA certificate, which are received by the backup system 150 at block 228. In response to the client-side handshake messages, the backup system 150 may respond with its own handshake messages at block 230, also encrypted using data from the one-way CA certificate, which are received by the client system at block 232 to establish the second secure communications channel. The handshake messages may entail, for example, generating a session key based on a public key included within the one-way CA certificate and a private key in possession of the client system (e.g., using key agreement techniques), and encrypting communications over the second secure communications channel using the session key. After the second secure communications channel, which is secured with the data from the one-way CA certificate as noted above, has been established in response to the exchange of handshake messages, the client system 110 may transmit, via the second secure communications channel at block 234, encrypted client data for storage on the backup system 150 (which is received at block 236). As indicated at line 240 onward, any subsequent communications between the client system 110 and the backup system 150 are encrypted using the CA certificate-based encryption. In an exemplary embodiment, the handshake messages and the second communications channel may be encrypted using an X509-based encryption cipher created from the data from the one-way CA certificate FIG. 3 is a flow diagram illustrating an example method of using certificate authority certificates inline as part of a file transfer protocol according to one or more embodiments of the disclosure. Process 300 may use processing logic, which may include software, hardware, or a combination thereof. For example, process 300 may be performed by a system including one or more components described in operating environment 100.

In 305, the system (e.g., client system 110) may receive a message across a first secure communications channel from a backup system (e.g., backup system 150) across a network connection. The first secure communications channel may be secured with previously-shared encryption key accessible by both the client system and the backup system i.e. a PSK. The message may include an indication of one-way certificate authority (CA) certificate encryption capability, which may provide a higher degree of security than the first secure communications channel. The client system may have security settings that do not require CA encryption, while the backup system may have security settings requiring at least one-way CA certificate encryption.

In 310, the client system may transmit, in response to the message and also via the first secure communications channel, a request to create a second secure communications channel using the one-way CA certificate. In 315, the client system may receive the one-way CA certificate, which may, in some embodiments, include data in the form of a public key associated with the backup system.

In 320, the client system may configure itself to use data (e.g., the public key associated with the backup system) from the one-way CA certificate to establish the second secure communications channel. The configuration may include, for example, generating a session key based on the data from the one-way CA certificate and key data on the client system (e.g., a private key of a public-private key pair). After the configuration is complete, at step 325 the backup system may exchange handshake messages that are encrypted using the data from the one-way CA certificate. For example, the handshake messages may be encrypted using the session key derived using the public key included in the one-way CA certificate. After the handshake procedure is complete, at 330 the client system may transmit, via the established second secure communications channel generated as a result of a successful handshake procedure, encrypted client data to the backup system.

FIG. 4 is a flow diagram illustrating an example method of using certificate authority certificates inline as part of a file transfer protocol from the perspective of a backup server, according to one or more embodiments of the disclosure. Process 400 may use processing logic, which may include software, hardware, or a combination thereof. For example, process 400 may be performed by a system including one or more components described in operating environment 100.

In 405, the system (e.g., backup system 150) may receive, from a client system (e.g., client system 110) in communication with the backup system via a network connection, a request for a first secure communications channel. The messages across the first secure communications channel may be secured with previously-shared encryption key (i.e., a PSK) accessible by both the client system and the backup system. As noted above, receiving the request for the first secure communications channel may trigger the comparison of the client version to determine if the client version supports CA certificate encryption. When the backup system determines that the client version supports CA certificate encryption, the backup system may respond at step 410 by completing the PSK authentication, where the authentication includes transmitting a message indicating that the backup system is capable of one-way CA certificate encryption. In some embodiments, this message may be transmitted based on the backup system identifying that the received client version of the file transfer protocol supports receiving a CA certificate.

In 412, the backup system may receive a query to establish a second secure communications channel (e.g., an OpenSSL query). In response to receiving the query, the backup system may at 414 compare security settings of the client system, received with the query, to backup system security settings to determine what level of security is supported. When the backup system determines that one-way CA certificate encryption is required, based on the comparison of security settings, the backup system prepares to establish the second secure communications channel. In some embodiments, the backup system may create a context associated with the second secure communications channel, which includes creating a pointer to a one-way CA certificate to a location in memory on the backup system. In response to the query and the comparison, the backup system may provide the one-way CA certificate at 415, where the one-way CA certificate is transmitted via the first secure communications channel (and accordingly, is encrypted using the pre-shared key prior to the transmission).

In 420, after the backup server has created the context associated with the second secure communications channel, the backup system and the client system may exchange, via the first secure communications channel, handshake messages that are encrypted using the data from the one-way CA certificate. In an exemplary embodiment, this may be done by the backup system receiving handshake messages associated with the second secure communications channel from the client system that are encrypted using data from the one-way CA certificate (e.g., a session key derived from a public key included in the one-way CA certificate). After the second secure communications channel, which is secured with the data from the one-way CA certificate, has been established in response to the exchange of handshake messages, the backup system may receive, via the second secure communications channel, encrypted client data for storage on the backup system at 425.

The methods and systems above describe a unique way of securely exchanging CA certificate inline there by making it easy for client-server to continue with certificate-based authentication. The certificate is transferred in a secure way where it is encrypted with a pre-shared key based on Diffie-Hellman (DH) parameters. The inline CA certificate transfer advantageously lifts the burden from applications to maintain and save the CA certificate so that client can use the CA certificate during authentication. This really helps for large scale deployments, where the backup server can maintain CA and send it to client. This way there is no need for potentially thousands of clients to maintain their own CA certificates. In some embodiments, CA certificate verification may only take place during establishment of the second secure communications channel. This may have several additional benefits. Since the CA certificate is exchanged as part of the connection process, no changes are required when a new CA certificate is issued to the backup system. When an updated CA certificate is issued, the updated CA certificate will be sent to the client system when a subsequent, third secure communications channel is established using the updated CA certificate between the client system and the backup system. To do so, the updated one-way CA certificate may be received by the client system via the first secure communications channel. The client system may then use data from the updated one-way CA certificate to establish a third secure communications channel, and transmit subsequent client data using the third secure communications channel that is secured using the data from the updated one-way CA certificate The revocation and updating of CA certificates can accordingly now be handled at a single place as opposed to multiple clients.

Figure 5:
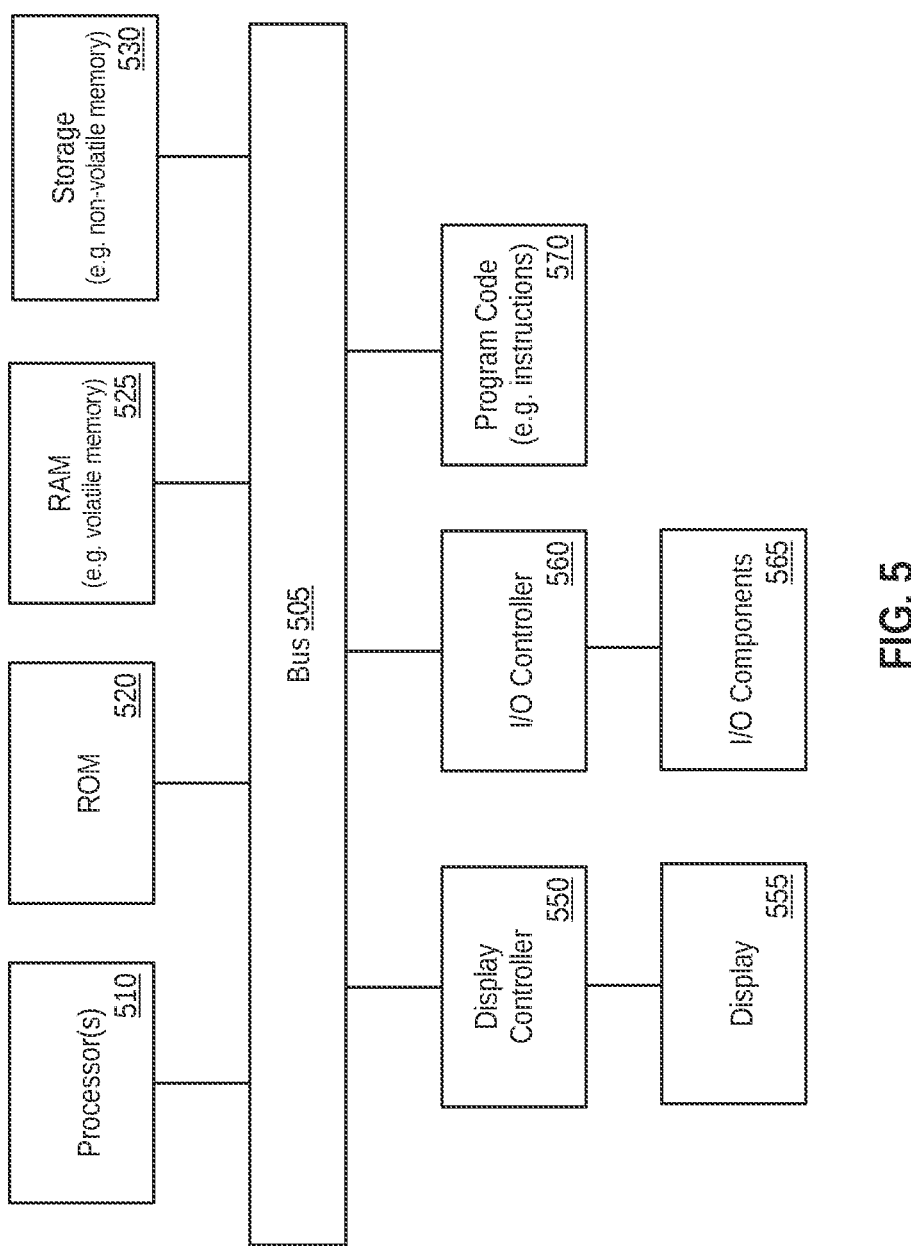
FIG. 5 is a block diagram illustrating an example computing system that may be used in conjunction with one or more embodiments of the disclosure.

FIG. 5 shows a block diagram of an example of a computing system that may be used in conjunction with one or more embodiments of the disclosure. For example, computing system 500 (or system, or server, or computing device, or device) may represent any of the devices or systems (e.g., backup system 150, operating environment 100, etc.) described herein that perform any of the processes, operations, or methods of the disclosure. Note that while the computing system 500 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 500 may include a bus 505 which may be coupled to a processor 510, ROM (Read Only Memory) 520, RAM (or volatile memory) 525, and storage (or non-volatile memory) 530. The processor(s) 510 may retrieve stored instructions from one or more of the memories 520, 525, and 530 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 510 may perform operations in an on-demand or "cloud computing" environment or as a service (e.g., within a "software as a service" (SaaS) implementation). Accordingly, the performance of operations may be distributed among the one or more processors 510, whether residing only within a single machine or deployed across a number of machines. For example, the one or more processors 510 may be located in a single geographic location (e.g., within a home environment, an office environment, or a server farm), or may be distributed across a number of geographic locations. The RAM 525 may be implemented as, for example, dynamic RAM (DRAM), or other types of memory that require power continually in order to refresh or maintain the data in the memory. Storage 530 may include, for example, magnetic, semiconductor, tape, optical, removable, non-removable, and other types of storage that maintain data even after power is removed from the system. It should be appreciated that storage 530 may be remote from the system (e.g., accessible via a network).

A display controller 550 may be coupled to the bus 505 in order to receive display data to be displayed on a display device 555, which can display any one of the user interface features or embodiments described herein and may be a local or a remote display device. The computing system 500 may also include one or more input/output (I/O) components 565 including mice, keyboards, touch screen, network interfaces, printers, speakers, and other devices. Typically, the input/output components 565 are coupled to the system through an input/output controller 560.

Program code 570 may represent any of the instructions, applications, software, libraries, toolkits, modules, components, engines, units, functions, logic, etc. as described herein (e.g., backup system 150). Program code 570 may reside, completely or at least partially, within the memories described herein (e.g., non-transitory computer-readable media), or within a processor during execution thereof by the computing system. Program code 570 may include both machine code, such as produced by a compiler, and files containing higher-level or intermediate code that may be executed by a computing system or other data processing apparatus (or machine) using an interpreter. In addition, program code 570 can be implemented as software, firmware, or functional circuitry within the computing system, or as combinations thereof. Program code 570 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g., any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g., and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A client system comprising:

one or more processors; and a non-transitory computer readable medium storing a plurality of instructions, which when executed, cause the one or more processors to:

receive, from a backup system in communication with the client system via a network connection, a message across a first secure communications channel that is secured with a previously-shared encryption key accessible by both the client system and the backup system, the message including an indication of one-way certificate authority (CA) certificate encryption capability, the client system having security settings that do not require CA encryption;

transmit, by the client system, in response to the message and via the first secure communications channel that directly connects the client system and the backup system, a request to create a second secure communications channel that directly connects the client system and the backup system;

receive, from the backup system via the first secure communications channel, a one-way CA certificate;

configure the client system to use data from the one-way CA certificate, received via the first secure communications channel that directly connects the client system and the backup system, to establish the second secure communications channel that directly connects the client system and the backup system, the data from the one-way CA certificate including a public key of a public key-private key pair that is based on a predetermined cipher suite;

exchange, with the backup system via the first secure communications channel, handshake messages that are encrypted using the data from the one-way CA certificate; and transmit, via the second secure communications channel that directly connects the client system and the backup system, encrypted client data for storage on the backup system, the second communications channel being secured with the data from the one-way CA certificate, received via the first secure communications channel that directly connects the client system and the backup system.

2. The system of claim 1, wherein the message across the first secure communications channel is received as part of a handshake procedure between the client system and the backup system that establishes the first secure communications channel.

3. The system of claim 1, wherein the configuring the client system comprises authenticating the received one-way CA certificate using network communications that include the one-way CA certificate between the client system and a CA system, the authenticating taking place prior to the exchanging of the handshake messages.

4. The system of claim 1, wherein the configuring the client system comprises decrypting the received one-way CA certificate using the previously-shared encryption key.

5. The system of claim 1, the plurality of instructions further causing the one or more processors to receive an updated one-way CA certificate, use data from the updated one-way CA certificate to establish a third secure communications channel, and transmit subsequent client data using the third secure communications channel that is secured using the data from the updated one-way CA certificate.

6. The system of claim 1, the handshake messages and the second communications channel being encrypted using an X509-based encryption cipher created from the data from the one-way CA certificate.

7. A method of using certificate authority certificates inline as part of a file transfer protocol, comprising:

receiving, by a client system, a message from a backup system across a first secure communications channel that is secured with a previously-shared encryption key accessible by both the client system and the backup system, the message including an indication of one-way certificate authority (CA) certificate encryption capability, the client system having security settings that do not require CA encryption;

transmitting, by the client system, in response to the message and via the first secure communications channel that directly connects the client system and the backup system, a request to create a second secure communications channel that directly connects the client system and the backup system;

receiving, from the backup system via the first secure communications channel, a one-way CA certificate;

configuring the client system to use data from the one-way CA certificate, received via the first secure communications channel that directly connects the client system and the backup system, to establish the second secure communications channel that directly connects the client system and the backup system, the data from the one-way CA certificate including a public key of a public key-private key pair that is based on a predetermined cipher suite;

exchanging, with the backup system via the first secure communications channel, handshake messages that are encrypted using the data from the one-way CA certificate; and transmitting, via the second secure communications channel that directly connects the client system and the backup system, encrypted client data for storage on the backup system, the second communications channel being secured with the data from the one-way CA certificate, received via the first secure communications channel that directly connects the client system and the backup system.

8. The method of claim 7, wherein the message across the first secure communications channel is received as part of a handshake procedure between the client system and the backup system that establishes the first secure communications channel.

9. The method of claim 7, wherein the configuring the client system comprises authenticating the received one-way CA certificate using network communications that include the one-way CA certificate between the client system and a CA system, the authenticating taking place prior to the exchanging of the handshake messages.

10. The method of claim 7, wherein the configuring the client system comprises decrypting the received one-way CA certificate using the previously-shared encryption key.

11. The method of claim 7, further comprising receiving an updated one-way CA certificate, use data from the updated one-way CA certificate to establish a third secure communications channel, and transmitting subsequent client data using the third secure communications channel that is secured using the data from the updated one-way CA certificate.

12. The method of claim 7, the handshake messages and the second communications channel being encrypted using an X509-based encryption cipher created from the data from the one-way CA certificate.

13. A computer program product comprising a non-transitory computer-readable medium having a computer-readable program code embodied therein to be executed by one or more processors of a client system, the program code including instructions to:

receive, from a backup system, a message across a first secure communications channel that is secured with a previously-shared encryption key accessible by both the client system and the backup system, the message including an indication of one-way certificate authority (CA) certificate encryption capability, the client system having security settings that do not require CA encryption;

transmit, by the client system, in response to the message and via the first secure communications channel that directly connects the client system and the backup system, a request to create a second secure communications channel that directly connects the client system and the backup system;

receive, from the backup system via the first secure communications channel, a one-way CA certificate;

configure the client system to use data from the one-way CA certificate, received via the first secure communications channel that directly connects the client system and the backup system, to establish the second secure communications channel that directly connects the client system and the backup system, the data from the one-way CA certificate including a public key of a public key-private key pair that is based on a predetermined cipher suite;

exchange, with the backup system via the first secure communications channel, handshake messages that are encrypted using the data from the one-way CA certificate; and transmit, via the second secure communications channel that directly connects the client system and the backup system, encrypted client data for storage on the backup system, the second communications channel being secured with the data from the one-way CA certificate, received via the first secure communications channel that directly connects the client system and the backup system.

14. The computer program product of claim 13, wherein the message across the first secure communications channel is received as part of a handshake procedure between the client system and the backup system that establishes the first secure communications channel.

15. The computer program product of claim 13, wherein the configuring the client system comprises authenticating the received one-way CA certificate using network communications that include the one-way CA certificate between the client system and a CA system, the authenticating taking place prior to the exchanging of the handshake messages.

16. The computer program product of claim 13, wherein the configuring the client system comprises decrypting the received one-way CA certificate using the previously-shared encryption key.

17. The computer program product of claim 13, the program code further including instructions to receive an updated one-way CA certificate, use data from the updated one-way CA certificate to establish a third secure communications channel, and transmit subsequent client data using the third secure communications channel that is secured using the data from the updated one-way CA certificate.

* * * * *